Figure 1:
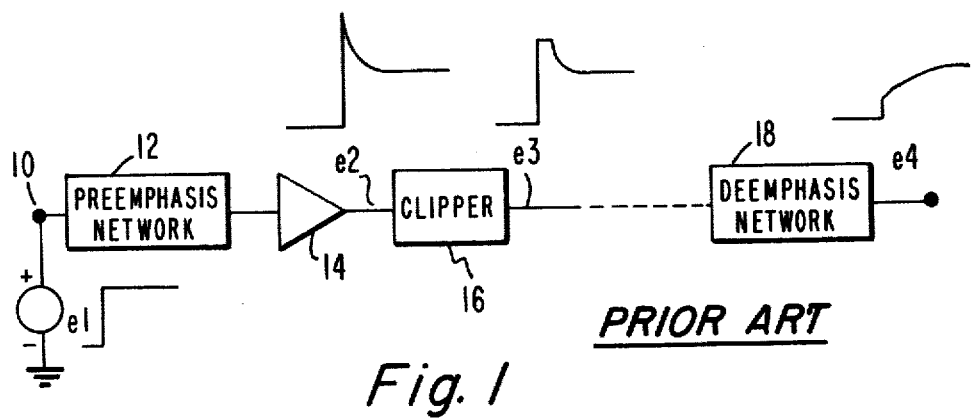

United States Patent [19]

Christopher

[11] 4,306,256
[45] Dec. 15, 1981

[54] PREEMPHASIS AND CLIPPING APPARATUS FOR REDUCING DISTORTIONS

[75] Inventor: Todd J. Christopher, Indianapolis, Ind.

[73] Assignee: RCA Corporation, New York, N.Y.

[21] Appl. No.: 181,381

[22] Filed: Aug. 22, 1980

Related U.S. Application Data

[63] Continuation of Ser. No. 20,334, Mar. 14, 1979.

[51] Int. Cl.³ .............................................. G11B 5/45
[52] U.S. Cl. ...................................... 360/65; 358/170
[58] Field of Search ........................ 360/65, 67, 68; 358/170

[56] References Cited

U.S. PATENT DOCUMENTS

| | | | |
|---|---|---|---|
| 3,007,010 | 10/1961 | Erath et al. | 360/65 |
| 3,117,278 | 1/1964 | Johnson | 360/65 |
| 3,288,930 | 11/1966 | Johnson | 358/166 |
| 3,980,815 | 9/1976 | Kaneko | 358/170 |
| 4,122,502 | 10/1978 | Kobayashi | 360/65 |
| 4,152,733 | 5/1979 | Melwisch | 360/65 |

FOREIGN PATENT DOCUMENTS

| | | |
|---|---|---|
| 1068247 | 5/1967 | United Kingdom . |
| 1082619 | 9/1967 | United Kingdom . |
| 1385493 | 2/1975 | United Kingdom . |
| 1386923 | 3/1975 | United Kingdom . |
| 1508687 | 4/1978 | United Kingdom . |
| 2022965 | 12/1979 | United Kingdom . |

Primary Examiner—Vincent P. Canney
Attorney, Agent, or Firm—E. M. Whitacre; J. S. Tripoli

[57] ABSTRACT

Preemphasis and clipping apparatus is provided in a system for translating a signal wave from an input terminal to another terminal. The preemphasis and clipping circuits are arranged to interact with each other, as opposed to being isolated from one another, in a manner which tends to reduce distortions of the translated signal wave. The clipping circuit is arranged to change a time constant associated with the preemphasis circuit during the operation of the clipping action. The interaction also causes the clipping to be maintained beyond the time it would normally fall off.

2 Claims, 2 Drawing Figures

PREEMPHASIS AND CLIPPING APPARATUS FOR REDUCING DISTORTIONS

This is a continuation of application Ser. No. 20,334, filed Mar. 14, 1979.

The present invention relates generally to overcoming distortions encountered in translating a signal through a communications channel and more specifically to the utilization of an interactive preemphasis and clipping arrangement for overcoming such distortions.

There are many systems where the technique of preemphasis and subsequent deemphasis is used to improve the signal to noise ratio. These systems may be generally regarded as comprising a communications channel having a predetermined bandwidth. Because the signal to noise characteristic of such systems often tends to degrade at high frequencies, it sometimes becomes necessary to pass the input signal through a network (preemphasis) which gradually enhances the high frequency components of the input signal across a high frequency range of the channel bandwidth. At the recovery end of such systems, the signal of interest is passed through a complementary network (deemphasis), i.e. a network which tends to attenuate the high frequency components of the signal in the aforementioned high frequency range.

It is often the case in such systems, especially frequency modulated (FM) systems such as video disc systems and video tape record/playback systems, that the preemphasis network causes the signal which is being processed to exceed the dynamic range of the system for short intervals especially during abrupt signal changes. For example, on step transitions in the input signal, the preemphasis of the higher frequencies results in large overshoots in the signal at the output of the preemphasis network in response to the step transitions. To avoid this problem of overshoots, the preemphasized signal is commonly clipped at predetermined levels to keep the dynamic range of the signal within the system capacity. After passing the signal through the system and performing the complementary deemphasis function, the recovered signal contains distortions which are caused by the previously mentioned clipping operation.

Typically, in prior art systems, the preemphasis network is isolated from the clipping circuit by an isolation amplifier or some form of impedance element. In each case, the standard prior art approach is to separate the two functions and not to provide interaction between the two functions.

In accordance with the present invention, a preemphasis circuit is responsive to an input signal wave for enhancing the frequency response of a main signal path over a relatively high frequency range of the channel bandwidth. The preemphasis circuit has a given time constant associated with it. A signal clipping means is connected to the main signal path and directly connected to the preemphasis circuit for limiting the amplitude excursions of the preemphasized signal to a prescribed level during clipping operation. The clipping means effects a change in the given time constant during the operation of the clipping means. A means is utilized for providing the signal at the output of the clipping means to another terminal.

In one embodiment of the present invention, the clipping means comprises at least one diode clipper and a clipper bias supply connected between the main signal path and a point of reference potential and directly connected to the preemphasis circuit.

Figure 2:
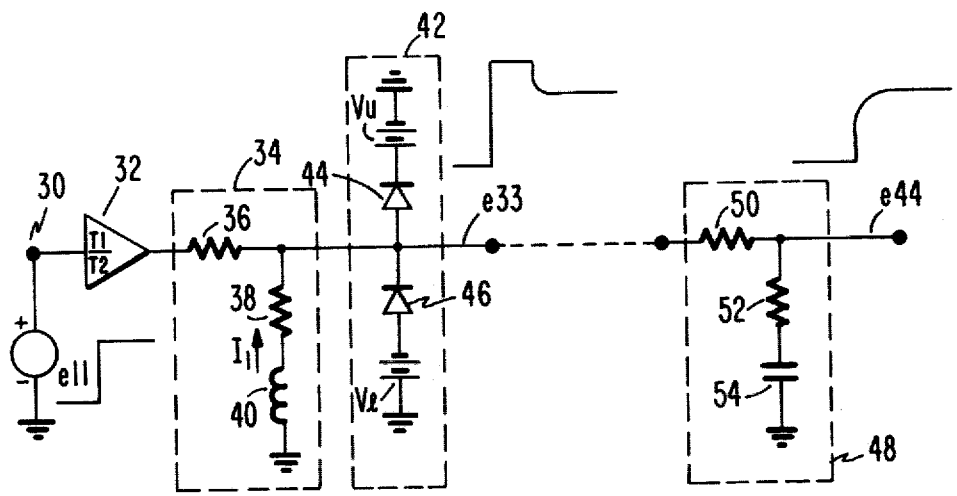

In the drawing:

FIG. 1 is a block diagram useful in the description of a prior art arrangement of a preemphasis network and a clipper; and FIG. 2 is a partial block and partial schematic diagram useful in describing the operation of a preemphasis and clipping arrangement in accordance with the principles of the present invention.

FIG. 1 is a representation of a communications channel where an input signal e1, which is shown as a step function, is provided at the input terminal 10 of a main signal path. The communication channel has a certain bandwidth associated with it. A preemphasis network 12 is connected to the input terminal 10. The preemphasis network is designed to enhance the high frequency components of the signal to be translated through the channel, that is, typically the preemphasis network has an amplitude versus frequency characteristic which rises across a high frequency range of the channel.

FIG. 1 also shows an isolation amplifier 14 connected in the main signal path between the preemphasis network 12 and a clipper circuit 16. The preemphasized signal e2 is shown as it would appear at the input to the clipper 16. The preemphasis network 12 enchances the high frequency components and thus the overshoot is generated in the e2 signal at the step transition. The clipper 16 responds to signal e2 by holding the signal at the preset clip level until the overshoot of the e2 signal falls to the clip level whereupon the clipper output signal e3 again tracks the e2 signal and continues to fall from the clip level to the step level as indicated.

It is noted that the preemphasis network 12 is isolated from the clipper 16 by amplifier 14. In other applications or systems, devices 12 and 16 may be isolated by a large impedance element. That is, in the standard arrangements, there is no interaction between the preemphasis and the clipping functions.

The dotted line in FIG. 1 is representative of the remainder of the communications channels which connects the clipper 16 to a deemphasis network 18. This connection may include a number of devices including modulators, amplifiers, switches and, in the case of video disc systems or video tape systems, the recording medium and the playback circuitry of the corresponding player which would include pick up devices, demodulators, and signal processing devices.

The signal provided at the output terminal of the deemphasis network 18 is shown as e4. The signal e4 shows a long recovery time to get to the step level of the original signal e1. The long recovery time is a result of the relatively long time constant associated with the deemphasis network 18 since, as a result of the clipping action, there was not sufficient energy in the signal applied to the deemphasis network 18 to rapidly bring the output signal from network 18 to its proper state. This slow recovery in the e4 signal provides distortions in the recovered signal. That is, ideally the e4 signal should be identical to the e1 signal. To the extent that they are not identical, there is distortion in the output signal e4.

By way of example, in a video disc system where the recovered signal e4, as shown in FIG. 1, is eventually to be provided, after further processing, to a TV display and the step level is representative of the white signal level in, for example, an NTSC signal, and the display desired is of a block of the color white, then the TV display would show horizontal lines starting at the gray level on one end of the horizontal line and going to white towards the other end of the scan line. This color graduation would appear line after line and make the white block look gray on one end and gradually turning to white towards the other end of the block in the horizontal direction. This is one type of defect which may occur as a result of the deemphasis network responding slowly, i.e., at its own rate, because energy was clipped off in the e3 signal. This is a phenomenon which appears to be associated with systems where the preemphasis is isolated from the clipper.

In order to reach the desired state of the e4 waveform in a very short time, and hopefully in the minimum possible time for a given deemphasis network without exceeding the clipping levels, it is desirable to extend the effective duration of the overshoot in the e2 waveform so that the clipping level in the e3 waveform will be held for a time sufficient to permit the deemphasis network to reach its correct state. One way of viewing this approach is to consider that the energy represented by the overshoot above the clip level is to be used to hold the e3 signal at the clip level for an extended time rather than simply discarding that energy.

Referring now to FIG. 2, a communications channel similar to that shown in FIG. 1, but incorporating the principles of the present invention, is shown. Again, for purposes of explanation, the input signal is shown as a step function with a waveform of e11 applied to an input terminal 30. The signal e11 is passed through an amplifier 32 having a gain of T1/T2 where T1 equals $2/\pi$ microseconds and T2 equals $\frac{1}{2}\pi$ microseconds. Therefore, the gain of amplifier 32, in the example under consideration, is equal to 4.

The signals from amplifier 32 are coupled to a preemphasis network 34 comprising a first resistor 36 having a value of $(1-T2/T1)R$, where R is equal to 75 ohms. Resistor 36 is connected in the main signal path. Network 34 further comprises a second resistor 38, having a value of $(T2/T1)R$, and an inductor 40, having a value of $(T2)R$ connected in series in the order named between one end of resistor 36 and a point of reference potential, namely ground. The signal appearing at the junction of resistors 36 and 38 in response to the input signal e11 will look very similar in certain aspects to the signal e2 in FIG. 1. That is, the signal at the aforementioned junction point will overshoot the step level as a result of the operation of the preemphasis network 34.

Directly connected to the network 34, i.e., without isolation devices interposed, is the clipping network 42. Network 42 comprises a fast acting diode 44 in series with an upper clip level voltage supply Vu connected between the main signal path and ground or the system reference potential. Network 42 further comprises a second fast acting diode 46 in series with a lower clip level voltage supply, V1, connected between the main signal path and ground. The junction between diodes 44 and 46 is directly connected via the main signal path to the junction between resistors 34 and 36 in the network 34.

In the arrangement shown in FIG. 2, the clipper 42 is designed to interact with the network 34. When the signal at the anode of diode 44 exceeds the amplitude level (i.e., clip level) necessary to overcome the upper supply voltage Vu, diode 44 turns on and the signal e33 is held at the clip level as before. However, energy is being stored in inductor 40 in the preemphasis network 34 at this time. When the overshoot in the preemphasized signal falls to the clip level, the clipping diode does not cut off immediately because the energy stored in inductor 40 in the form of a current I1, is now discharged through the circuit loop comprising resistor 38, inductor 40, supply Vu and diode 44. In this way, diode clipper 44 is held on for a longer than usual time as shown in the waveform e33. In this way, the energy represented by the overshoot above the clip level may be thought of as being used to hold the clip level beyond the normal time in contrast to the situation where clipper 42 is normally isolated from the preemphasis network 34.

Another way of viewing the operation of the interactive preemphasis and clipping action is in terms of time constants. The energy stored in inductor 40 is applied at the time constant rate of the value of inductor 40 divided by the sum of the value of resistor 38 and the value of resistor 36. When the clipping diode 44 is turned on, the effective time constant is the value of inductor 40 divided by the value of resistor 38. The lengthened time constant keeps the current flowing through diode 44 for a time beyond that which would obtain if the preemphasis circuit 34 was isolated from the clipper 42.

Diode 46 is used to provide clipping for excursion of the signal beyond the desired level in the opposite polarity. Diode 46 and supply V1 interact with resistor 38 and inductor 40 in network 34 in the very same way as described above for this other polarity signal on the main signal path.

Again, the dotted line in the main signal path shown in FIG. 2 represents the devices and medium which exist in the communications channel between the clipper network 42 and the deemphasis network 48. Deemphasis network 48 comprises a resistor 50, having a value of $(T1/T2-1)R$ ohms, connected in the main signal path and the series combination of resistor 52, having a value of R ohms, and capacitor 54, having a value of T2/R farads, connected between one end of resistor 50 and ground. As shown, the deemphasized signal e44 is undistorted, that is equal to the input signal e11, except when the diode clipper is actually conducting. But, the overall response is such that the waveform of e44 rises more rapidly than that of e4 as a consequence of holding the clip level for an extended period of time. Thus, to the extent that the waveform e44 is a closer replica of the step signal e11, as compared to the signal e4, the arrangement shown in FIG. 2 reduces distortions in the recovered output signal.

The values of the elements in the preemphasis network 34, the deemphasis network 48 and the gain of amplifier 32 in terms of T1, T2 and R were derived by the application of Laplace transform functions and represent the parameters which would make the waveform e11 equal to waveform e44 under ideal conditions. This condition is precisely what is desired in order to have the recovered signal wave as an undistorted version of the input signal wave. In dealing with actual circuits, a complete lack of distortion is not readily achieved but it has been found that the interactive preemphasis and clipping arrangement as described herein is effective to reduce distortions in the signal recovered at the output of the deemphasis network 48.

What is claimed is:

1. In a system for translating a signal wave from an input terminal to another terminal and thence to an output terminal along a main signal path having a certain frequency bandwidth, said main signal path including apparatus for providing signal preemphasis, and, a linear deemphasis circuit connected between said other terminal and said output terminal, the combination comprising:

a preemphasis circuit responsive to the signal wave provided at said input terminal for enhancing the frequency response to said main signal path over a relatively high frequency range of said bandwidth, said preemphasis circuit comprising a first resistive element connected in said main signal path and the series combination of a second resistive element and an inductive energy storing element connected between said main signal path and a point of reference potential, said preemphasis circuit having a given time constant substantially determined by the values of said first and second resistive elements and said inductive energy storing element;

a signal clipping circuit comprising a first diode and a first source of non-zero potential connected in series between a point of reference potential and said main signal path, said clipping circuit further comprising a second diode and a second source of non-zero potential connected in series between said point of reference potential and said main signal path, said first and second diodes being oppositely poled in said clipping circuit, said first diode and said second diode being connected directly and without intervening elements to said series combination for limiting the amplitude excursions of the preemphasized signal to first and second non-zero levels during operation of said clipping circuit, said clipping circuit effecting a change in said given time constant during said operation by substantially removing the influence of one of said first and second resistive elements on said given time constant, said inductive energy storing element being effective to maintain the operation of said clipping means for a time period beyond the time when said preemphasized signal wave has an absolute amplitude value less than said first and second non-zero levels;

means for providing the signal wave at the output of said clipping circuit to said other terminal; and output circuit means responsive to the signal at said other terminal for providing a signal at said output terminal which is a substantial replica of said input signal at times other than times corresponding to the operation of said clipping circuit, said output circuit means including a deemphasis circuit comprising a third resistive element in said main signal path and the series combination of a fourth resistive element and a capacitive energy storing element connected between said main signal path and said point of reference potential.

2. The combination according to claim 1 wherein said first, second, third and fourth resistive elements have relative values of $(1-T2/T1)R$, $(T2/T1)R$, $(T1/T2-1)R$, and $R$ respectively, and said inductive element and said capacitive element have relative values of $(T2)R$ and $T2/R$ respectively, where T1, T2 and R are constants.

* * * * *